US010131240B2

(12) United States Patent
Lu

(10) Patent No.: US 10,131,240 B2
(45) Date of Patent: Nov. 20, 2018

(54) CHARGING DEVICE, REMINDING SYSTEM AND REMINDING METHOD FOR VEHICLE CONDITION

(71) Applicant: Shenzhen Airdrawing Technology Service Co., Ltd, Shenzhen (CN)

(72) Inventor: Pen-Uei Lu, New Taipei (TW)

(73) Assignee: Shenzhen Airdrawing Technology Service Co., Ltd, Shenzhen (CN)

( * ) Notice: Subject to any disclaimer, the term of this patent is extended or adjusted under 35 U.S.C. 154(b) by 0 days.

(21) Appl. No.: 15/191,536

(22) Filed: Jun. 24, 2016

(65) Prior Publication Data

US 2017/0305288 A1 Oct. 26, 2017

(30) Foreign Application Priority Data

Apr. 21, 2016 (CN) .......................... 2016 1 0249430

(51) Int. Cl.
*B60L 11/18* (2006.01)
*G07C 5/00* (2006.01)
*G07C 5/08* (2006.01)

(52) U.S. Cl.
CPC ....... *B60L 11/1838* (2013.01); *B60L 11/1816* (2013.01); *G07C 5/006* (2013.01); *G07C 5/008* (2013.01); *G07C 5/0808* (2013.01); *G07C 5/0825* (2013.01); *B60L 2230/16* (2013.01)

(58) Field of Classification Search
CPC .. B60L 11/1838; B60L 11/1816; G07C 5/006; G07C 5/008; G07C 5/0808; G07C 5/0825
USPC ........................................................ 701/31.6
See application file for complete search history.

(56) References Cited

U.S. PATENT DOCUMENTS

| | | | | |
|---|---|---|---|---|
| 8,838,362 B2 * | 9/2014 | Higgins | G07C 5/0858 | 701/102 |
| 2009/0112395 A1 * | 4/2009 | Prokhorov | G01M 15/05 | 701/31.4 |
| 2012/0303829 A1 * | 11/2012 | LaFrance | B60L 11/1848 | 709/229 |

* cited by examiner

*Primary Examiner* — Muhammad Shafi
(74) *Attorney, Agent, or Firm* — ScienBiziP, P.C.

(57) ABSTRACT

A smart vehicle charging device includes a charging unit, a communication unit communicating with the vehicle, a storage unit with pre-stored information, a display unit, and a processing unit. The processing unit obtains information as to instant vehicle condition, processes the information, and transmits the information of vehicle condition to the display unit. The processing unit further can compare the instant information with information as to vehicle condition which is pre-stored. The processing unit determines whether the instant vehicle condition matches with the pre-stored information. A system and a method for reminding as to vehicle condition are also provided.

4 Claims, 4 Drawing Sheets

CHARGING DEVICE, REMINDING SYSTEM AND REMINDING METHOD FOR VEHICLE CONDITION

FIELD

The subject matter herein generally relates to a charging device, a reminding system for vehicle condition, and a reminding method for vehicle condition.

BACKGROUND

With the development of science and technology, fuel vehicles are being replaced by electric vehicles. Charging devices are used to charge the electric vehicles.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
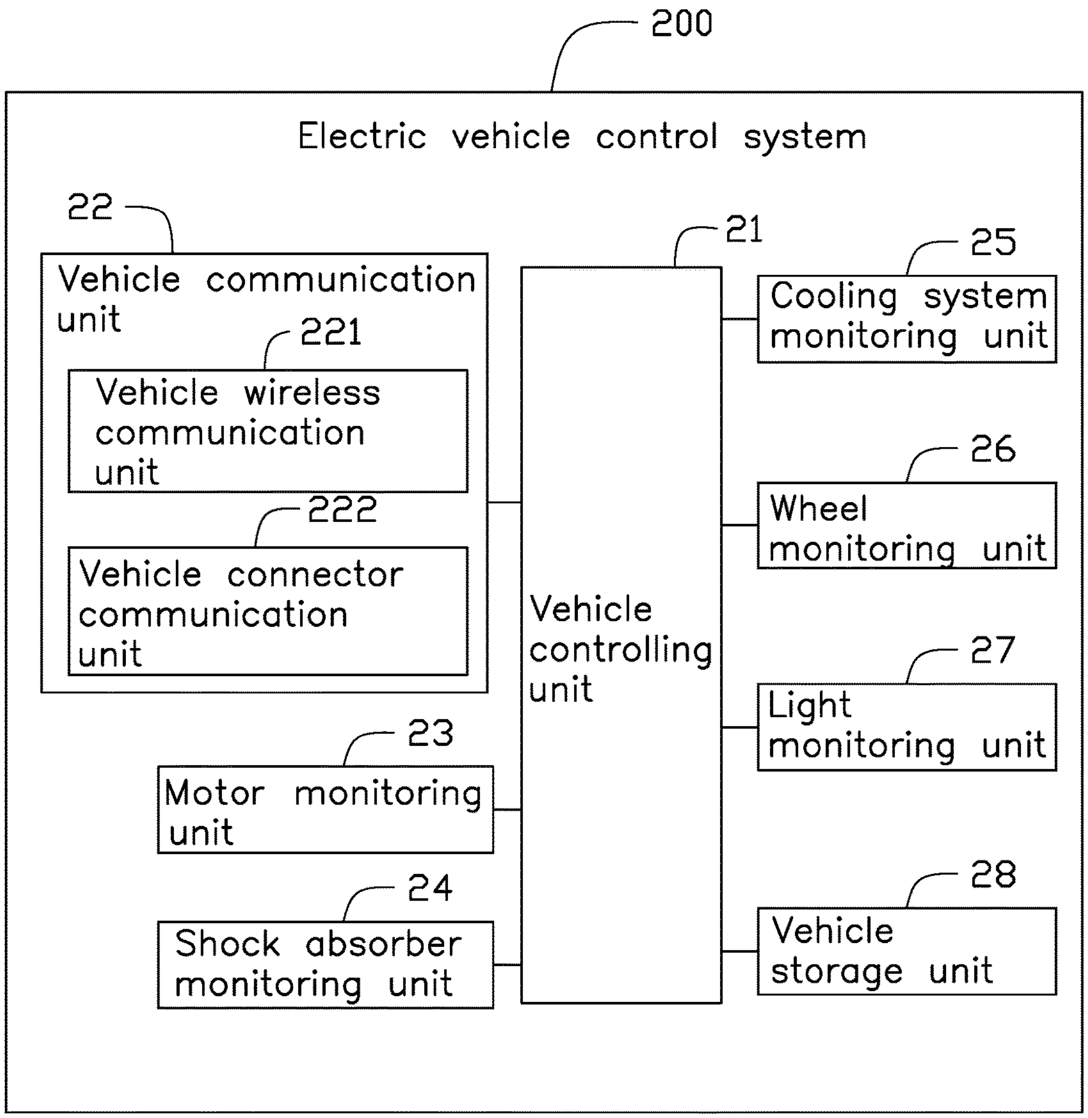
FIG. 1 is a block diagram of an embodiment of a vehicle control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

A vehicle condition reminding system is disclosed. The vehicle condition reminding system includes at least one processing unit, and a non-transitory computer readable medium coupled to the at least one processing unit and configured to store instructions for execution by the at least one processing unit. The instructions cause the at least one processing unit to control a display unit to display an information of vehicle condition. The instructions cause the at least one processing unit to compare information of vehicle condition which is received with a pre-stored information. The instructions cause the at least one processing unit to determine whether the received information of vehicle condition matches with the pre-stored information. The instructions cause the at least one processing unit to issue an alarm when the information of vehicle condition does not match with the pre-stored information.

The present disclosure also relates to a vehicle condition reminding method. The vehicle condition reminding method includes steps as follows; controlling a display unit to display an information of vehicle condition upon receiving the information of vehicle condition, comparing the information of vehicle condition with a pre-stored information; determining whether the information of vehicle condition matches with the pre-stored information and issuing an alarm when the information of vehicle condition is in an abnormal state.

The present disclosure also relates to a charging device. The charging device includes a charging unit to recharge a battery of an electric vehicle, a communication unit communicating with the electric vehicle, a storage unit storing a pre-stored information of vehicle condition, a display unit, and a processing unit. The processing unit couples with the charging unit, the communication unit, the storage unit, and the display unit. The processing unit obtains an information of vehicle condition, processes the information of vehicle condition, and can transmit the information of vehicle condition to the display unit. The processing unit further compares the information of vehicle condition with the pre-stored information of vehicle condition, and determines whether the information of vehicle condition matches with the pre-stored information. When the information of vehicle condition does not match with the pre-stored information, the information as to vehicle condition is transmitted to the display unit.

FIG. 1 shows an embodiment of an electric vehicle control system 200. The electric vehicle control system 200 can be mounted on an electric vehicle. The electric vehicle control system 200 can include a vehicle controlling unit 21 and a vehicle communication unit 22. The vehicle communication unit 22 can be electrically coupled to the vehicle controlling unit 21. The vehicle communication unit 22 can include a vehicle wireless communication unit 221 and a vehicle connector communication unit 222. In at least one embodiment, the vehicle wireless communication unit 221 can include a WIFI communication unit and/or a BLUETOOTH communication unit (not shown).

The electric vehicle control system 200 can further include a plurality of monitoring units electrically coupled to the vehicle controlling unit 21. The vehicle controlling unit 21 can be configured to obtain instant information of vehicle condition from the monitoring units, can process the information of vehicle condition, and can transmit the information of vehicle condition to the charging device. In at least one embodiment, the monitoring units can include a motor monitoring unit 23, a shock absorber monitoring unit 24, a cooling system monitoring unit 25, a wheel monitoring unit 26, and a light monitoring unit 27. In other embodiments, the monitoring unit can be monitoring units other than the above monitoring units.

In at least one embodiment, the vehicle control system 200 can further include a vehicle storage unit 28 electrically coupled to the vehicle controlling unit 21. The vehicle storage unit 28 can be configured to pre-store information of vehicle condition. The pre-stored information of vehicle condition can include, but is not limited to, information of the motor, the cooling system of the electric vehicle, the wheels, the lights, and other functional systems and components. The vehicle controlling unit 21 can obtain pre-stored information of vehicle condition from the vehicle storage unit 28, and transmit the pre-stored information of vehicle condition and instant information of vehicle condition to the charging device 100.

In another embodiment, the vehicle controlling unit 21 can be configured to compare the instant information of vehicle condition with the pre-stored vehicle condition, determine whether the instant information matches with the pre-stored information of vehicle condition, and transmit both information of vehicle condition and any evaluations or determinations arising therefrom to the charging device 100. If the information of vehicle condition matches with the pre-stored information of vehicle condition a normal state is indicated, otherwise, the vehicle is deemed to be in an abnormal state.

Figure 2:
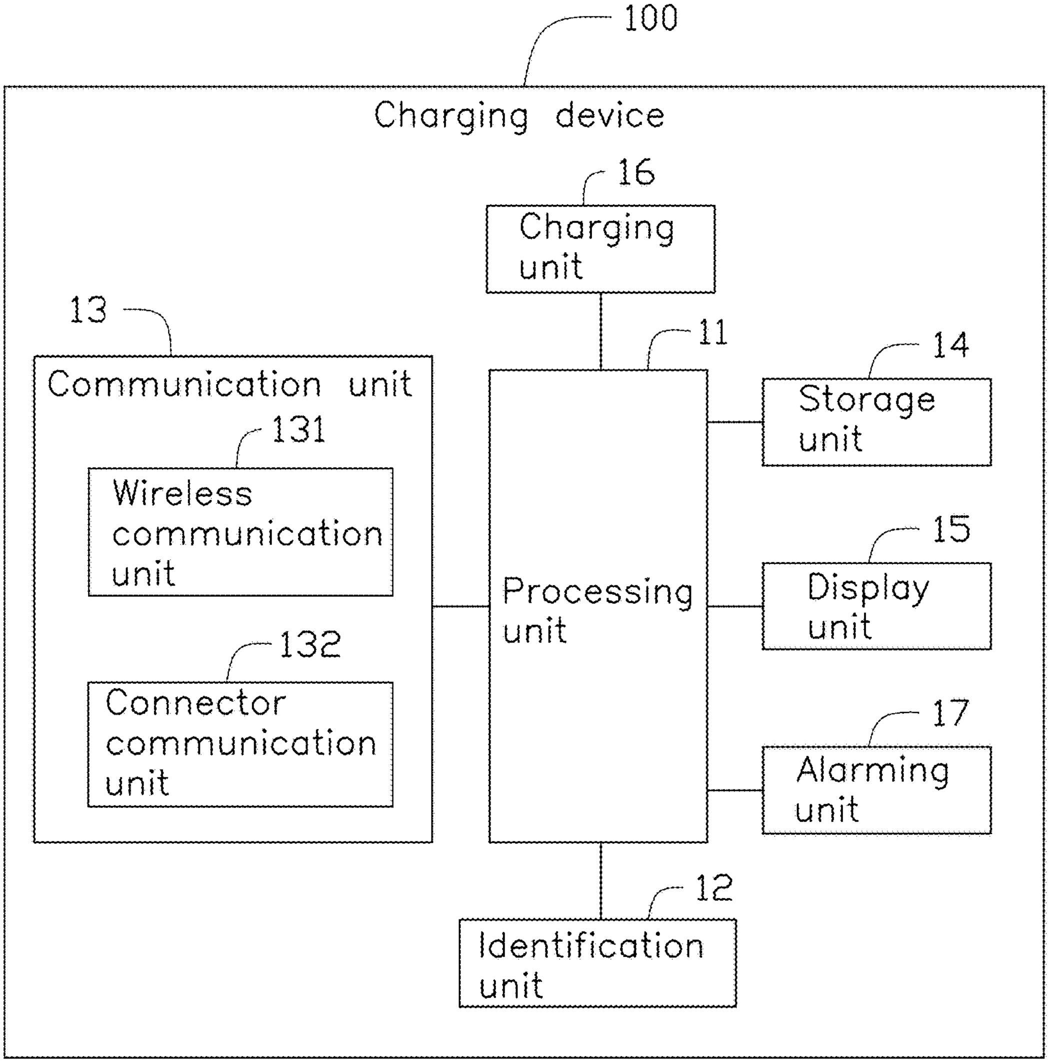
FIG. 2 is a block diagram of an embodiment of a charging device capable of communicating with the vehicle control system of FIG. 1.

FIG. 2 illustrates that a charging device 100 can include a processing unit 11, an identification unit 12, a communication unit 13, a storage unit 14, a display unit 15, and a charging unit 16. The identification unit 12, the communication unit 13, the storage unit 14, the display unit 15, and the charging unit 16 can be electrically coupled to the processing unit 11.

The identification unit 12 can be used to read an identification card identifying a user. The identification card can be a radio-frequency identification (RFID) card.

The charging unit 16 can charge the battery of the electric vehicle. The charging unit 16 can include a power distribution unit, an AC charging unit or a DC charging unit, and a charging terminal or outlet (not shown). The charging unit 16 can be coupled to the battery of the electric vehicle, and the power distribution unit can be used to output different currents to the electric vehicle depending on the demand of the electric vehicle.

The communication unit 13 can communicate with the electric vehicle. The communication unit 13 can include a wireless communication unit 131 and a connector communication unit 132. The wireless communication unit 131 can be used to communicate with the vehicle wireless communication unit 221, receive the information of vehicle condition from the vehicle controlling unit 21, and transmit the information of vehicle condition to the processing unit 11. The wireless communication unit 221 can include a WIFI communication unit and/or a BLUETOOTH communication unit (not shown).

The connector communication unit 132 can communicate with the vehicle connector communication unit 222, receive the information of vehicle condition from the vehicle controlling unit 21, and transmit the information of vehicle condition to the processing unit 11. In at least one embodiment, a first connector can be mounted on the charging terminal, and a second connector can be mounted on the battery of the electric vehicle. When the charging terminal is coupled to the battery of the electric vehicle, the connector communication unit 132 can receive the information of vehicle condition transmitted by the vehicle connector communication unit 222.

The storage unit 14 can pre-store information of vehicle condition. The pre-stored information can include, but is not limited to, information as to the motor, the cooling system, the wheels, the lights, and the like.

The storage unit 14 can further store information as to user identifications.

The storage unit 14 can further store information as to available vehicle servicing stations.

In at least one embodiment, the storage unit 14 can be an internal storage system, such as a flash memory, a random access memory (RAM) for temporary storage of information, and/or a read-memory (ROM) for permanent storage of information.

The processing unit 11 can be used to obtain the instant information of vehicle condition, process the information, and transmit the information of vehicle condition to the display unit 15. The processing unit 11 can be further used to compare the instant information of vehicle condition with the pre-stored vehicle condition, determine whether the vehicle is in a normal state, and transmit any abnormal information of vehicle condition to the display unit 15. If the instant information of vehicle condition does not match with the pre-stored information, it indicates that the instant information of vehicle condition is abnormal and that the vehicle condition is not normal.

In at least one embodiment, the processing unit 11 can be a microprocessor.

The display unit 15 can display the information of vehicle condition processed by the processing unit 11. In at least one embodiment, the display unit 15 can be a touch screen. The display unit 15 can be further used to receive a query from the user, and transmit the query to the processing unit 11.

The processing unit 11 can process the query to search through all information and transmit a result of search to the display unit 15. In at least one embodiment, the result of search can be a solution related to the vehicle condition. For example, when the wheels or one of them is abnormal, the user can input a query to the processing unit 11, and the processing unit 11 can search for servicing stations nearby and transmit servicing stations information to the display unit 15. In at least one embodiment, the processing unit 11 can search in the information stored in the storage unit 14. In other embodiments, the processing unit 11 can get the servicing stations information by web search.

After the user is identified, the identification unit 12 can send an identification signal to the processing unit 11, and the processing unit 11 can activate the wireless communication unit 131 to turn on upon receiving the identification signal, thereby a wireless communication can be established between the wireless communication unit 131 and the vehicle wireless communication unit 221. After the charging process has finished, the identification unit 12 can send another identification signal to the processing unit 11, and the processing unit 11 can turn off the wireless communication unit 131, thereby the wireless communication unit 131 can no longer communicate with the vehicle wireless communication unit 221.

The communication unit 13 can receive the instant information of vehicle condition transmitted by the vehicle communication unit 22, and the processing unit 11 can process the information of vehicle condition and transmit the information of vehicle condition to the display unit 15. The charging device 100 can provide information of vehicle condition to the user when recharging the electric vehicle.

In at least one embodiment, the charging device 100 can further include an alarm unit 17 electrically coupled to the processing unit 11. The alarm unit 17 can issue an alarm when the vehicle condition is abnormal. In at least one embodiment, the alarm unit 17 can sound an alarm or issue a voice message when the vehicle condition is abnormal.

Figure 3:
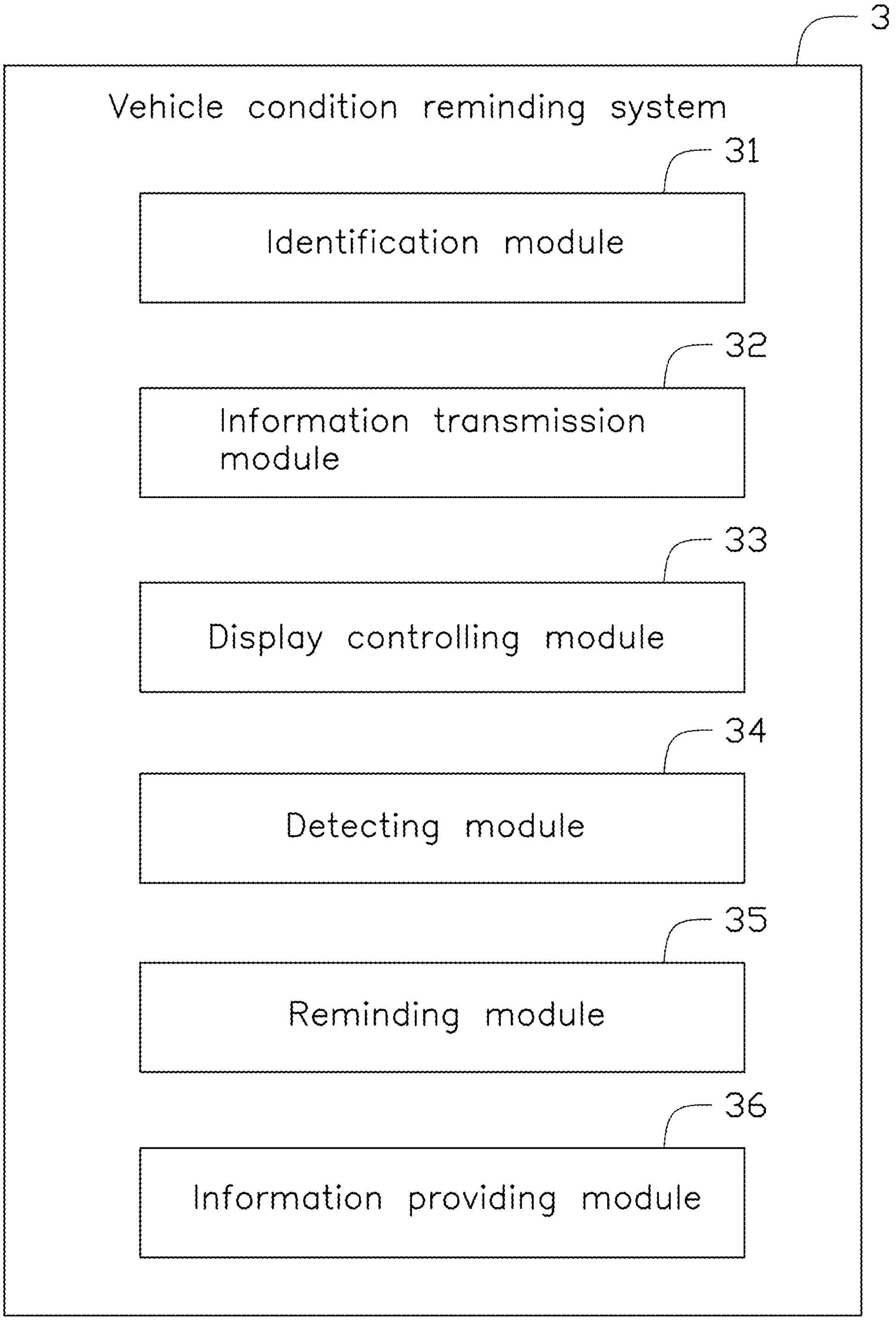
FIG. 3 is a block diagram of an embodiment of a reminding system for vehicle condition.

FIG. 3 illustrates a vehicle condition reminding system 3. The vehicle condition reminding system 3 can include a plurality of modules. The plurality of modules can include an identification module 31, an information transmission module 32, a display control module 33, a detecting module 34, a reminding module 35, and a signal providing module 36.

In at least one embodiment, the information transmission module 32 can be stored in the vehicle storage unit 28 of the electric vehicle, and further applied to the vehicle controlling unit 21. The identification module 31, the display control module 33, the detecting module 34, the reminding module 35, and the signal providing module 36 can be stored in the storage unit 14 of the charging device 100, and further applied to the processing unit 11 of the charging device 100. In other embodiments, the modules of the vehicle condition reminding system 3 can include separated functionalities represented by hardware or integrated circuits, or by software and hardware combinations, such as a special-purpose processor or a general-purpose processor with special-purpose firmware.

In other embodiments, the detecting module 34 can be stored in the vehicle storage unit 28 of the electric vehicle, and applied in the vehicle controlling unit 21.

The identification unit 31 can be used to identify a user. Identifying a user depends on an identification signal being generated by the identification unit 12, the information as to instant user being compared with the user's information stored in the storage unit 14, and a determination made as to whether the instant user information is matched with a stored user information. If the user information matches with a stored user, the user is authenticated. Otherwise, the user is not authenticated. After the user is authenticated, the charging unit 16 starts to charge the electric vehicle.

The information transmission module 32 can control the vehicle communication unit 22 to transmit instant information of vehicle condition to the charging device 100.

The display control unit 33 can control the display unit 15 to display the information of vehicle condition after receiving the instant information of vehicle condition.

The detecting information unit 34 can compare the instant information as to vehicle condition with parameters or vehicle condition value ranges, and can further determine whether the vehicle condition is normal or otherwise.

The reminding module 35 can be used to control the alarming module 17 to issue an alarm when the detecting information unit 34 determines that the information of vehicle condition represents one or more abnormalities. In at least one embodiment, the reminding module 35 can be further used to control the alarming module 17 to issue an alarm after the processing unit 11 has received the information of vehicle condition indicating an abnormality.

The information providing module 36 can be used to search for a solution when an abnormality in vehicle condition is detected. For example, the information providing module 36 can be used to search for vehicle servicing stations near the charging device 100.

Figure 4:
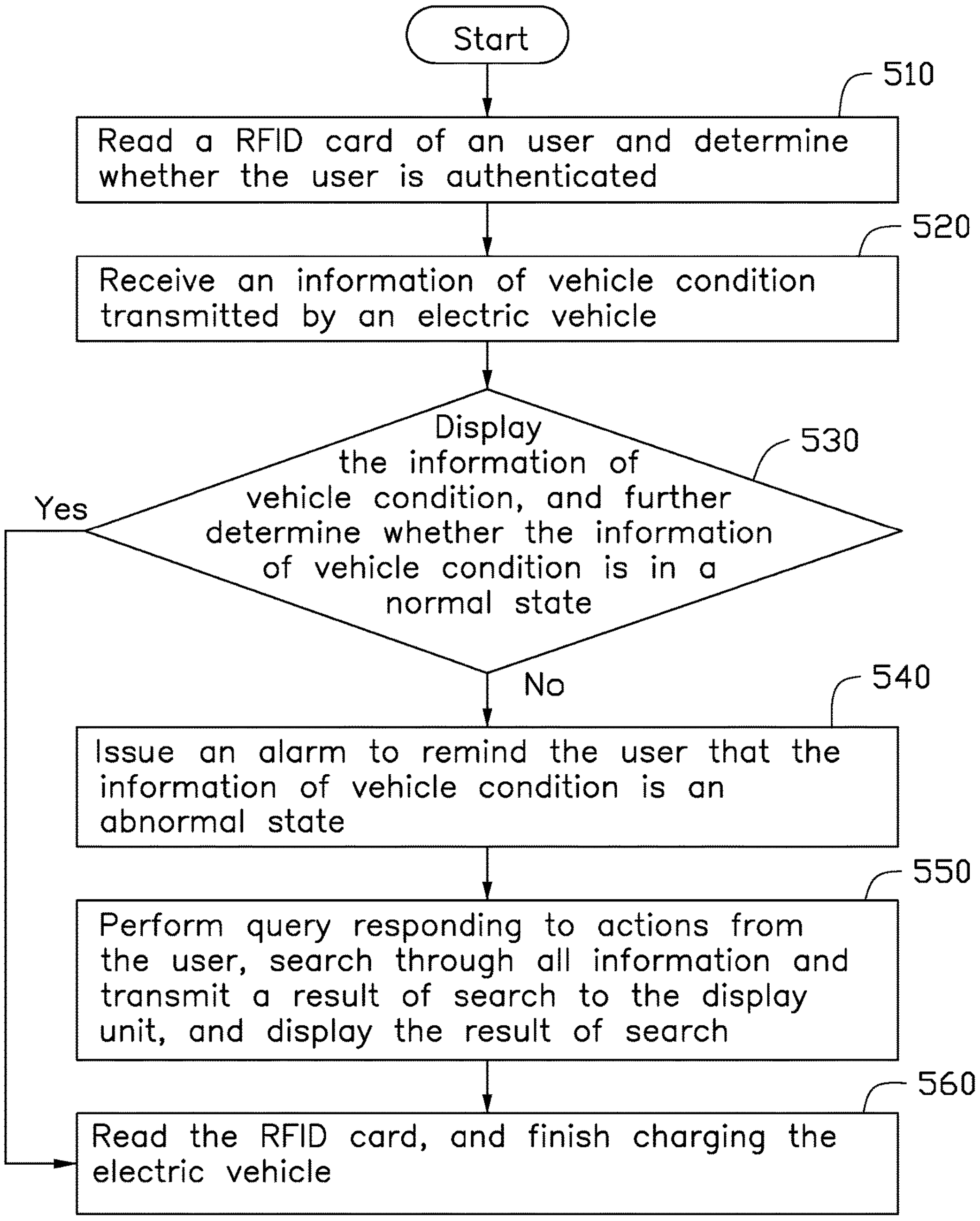
FIG. 4 is a flowchart of an embodiment of a reminding method for vehicle condition.

FIG. 4 illustrates a flowchart of a method for detecting and warning as to vehicle condition. The vehicle condition reminding method is provided by way of example, as there are a variety of ways to carry out the method. The vehicle condition reminding method described below can be carried out using the configurations illustrated in FIGS. 1 and 2, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 510.

At block 510, an identification unit reads a RFID card of a user and determines whether the user is authenticated. If the user is authenticated, a charging terminal or outlet of a charging device is connected to a battery of an electric vehicle, and the charging device starts to recharge the battery of the electric vehicle.

At block 520, the charging device receives an information transmitted by the electric vehicle. A communication unit establishes communication with a vehicle communication unit, thus a processing unit obtains the information of vehicle condition from a vehicle controlling unit.

If the electric vehicle is equipped with a vehicle connector communication unit, the vehicle connector communication unit establishes communication with charging device connector communication unit.

If the electric vehicle has no vehicle communication unit, the identification unit transmits an identification signal to the processing unit, the processing unit activates the wireless communication unit to turn on, and the wireless communication unit of the charging device establishes communication with the vehicle wireless communication unit.

At block 530, the processing unit processes the information of vehicle condition and transmits the processed information of vehicle condition to a display unit, and the display unit displays the information of vehicle condition. The processing unit further compares the information of vehicle condition which is received with the pre-stored information of vehicle condition and determines whether the information of vehicle condition is in an normal state. If yes, the process goes to block 560. If not, the process goes to bock 540. If the information of vehicle condition matches with the pre-stored information of vehicle condition, an normal state is indicated.

At block 540, the processing unit controls an alarm unit to remind the user that the information of vehicle condition is in an abnormal state.

At block 550, the processing unit processes a query responding to actions from the user to search through all information and transmit a result of search to the display unit, and the display unit displays the result of search. The result of search can be a detailed information of vehicle condition or an information of nearby vehicle servicing stations, and the display unit displays the result of search.

At block 560, the identification unit read the RFID card again, and the charging process to the electric vehicle is finished. The identification unit further transmits a signal of identification to the processing unit, and the processing unit control the wireless communication unit to be turn off. The charging device no longer obtains information from the electric vehicle.

If the user does not want to know the detail of the abnormal information, or the nearby vehicle servicing stations, the process at block 550 can be omitted.

The charging device 100 includes the processing unit 11, the communication unit 13, and the display unit 15. The communication unit 13 can communicate with the vehicle communication unit 22, thus the processing unit 11 can obtain the information of vehicle condition from the electric vehicle, and the display unit 15 can display the information of vehicle condition. Therefore, the charging device 100 can display the information of vehicle condition when charging the electric vehicle. The processing unit 11 can be used to process the query of the user, and provide the information of nearby vehicle serving stations to the user to bring convenience for the user.

In other embodiments, the processing unit 15 can receive the query from an input device, such as keys mounted on the charging device 100.

In other embodiments, the connector communication unit 132 can be omitted, and the charging device can communicates with the electric vehicle by the wireless communication unit 131.

In other embodiments, wireless communication unit 131 can be omitted, and the charging device can communicates with the electric vehicle by the connector communication unit 132.

The embodiments shown and described above are only examples. Many details are often found in the art such as the features of charging device and reminding system and reminding method for vehicle condition. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claim.

What is claimed is:

1. A vehicle condition reminding system comprising:

at least one processing unit; and a non-transitory computer readable medium coupled to the at least one processing unit and storing instructions for execution by the at least one processing unit, the instructions causing the at least one processing unit to:

recharge a battery of an electric vehicle;

transmit an information of vehicle condition to a charging device, when a charging device connector communication unit communicates with a vehicle connector communication unit;

display the information of vehicle condition which is received on the charging device;

compare the received information of vehicle condition with pre-stored information of vehicle condition;

determine whether the received information of vehicle condition matches with the pre-stored information; and issue an alarm when the information of vehicle condition does not match with the pre-stored information.

2. The vehicle condition reminding system as claimed in claim 1, wherein the instructions further cause the at least one processing unit to:

read an identification card of a user;

compare user information with pre-stored users information; and identify the user based on the comparison of the user information with the pre-stored users information.

3. The vehicle condition reminding system as claimed in claim 1, wherein the instructions further cause the at least one processing unit to:

search a solution in accordance with the information of vehicle condition when the information of vehicle condition does not match with the pre-stored information.

4. The vehicle condition reminding system as claimed in claim 3, wherein the solution is obtained by local search or web search.

* * * * *